(12) United States Patent
Lammers et al.

(10) Patent No.: US 12,712,341 B2
(45) Date of Patent: Aug. 18, 2026

(54) EXHAUST OF HOT GASES RESULTING FROM AN ARC EVENT IN AN ELECTRIC SWITCHGEAR

(71) Applicant: EATON INTELLIGENT POWER LIMITED, Dublin (IE)

(72) Inventors: Wim Lammers, Delden (NL); Gerard Schoonenberg, Hengelo (NL)

(73) Assignee: EATON INTELLIGENT POWER LIMITED, Dublin (IE)

( * ) Notice: Subject to any disclaimer, the term of this patent is extended or adjusted under 35 U.S.C. 154(b) by 217 days.

(21) Appl. No.: 18/604,777

(22) Filed: Mar. 14, 2024

(65) Prior Publication Data

US 2024/0313511 A1 Sep. 19, 2024

(30) Foreign Application Priority Data

Mar. 16, 2023 (GB) ...................................... 2303866

(51) Int. Cl.
*H02B 1/56* (2006.01)

(52) U.S. Cl.
CPC ...................................... *H02B 1/56* (2013.01)

(58) Field of Classification Search
CPC ................................ H02B 1/56; H02B 13/025
See application file for complete search history.

(56) References Cited

U.S. PATENT DOCUMENTS

2013/0240485 A1* 9/2013 Yabu .................. H02B 13/0354 218/139
2016/0043532 A1* 2/2016 Zende .................. H02B 13/025 361/611
2016/0044823 A1* 2/2016 Bhattacharya ..... H05K 7/20009 29/592.1

FOREIGN PATENT DOCUMENTS

CN 111682435 A 9/2020

* cited by examiner

*Primary Examiner* — Timothy J Thompson
*Assistant Examiner* — Rhadames Alonzo Miller
(74) *Attorney, Agent, or Firm* — LEYDIG, VOIT & MAYER, LTD.

(57) ABSTRACT

Some embodiments relate to an electric switchgear is disclosed, which comprises a switchgear with a switchgear housing and an exhaust channel, which passes through or connects to an opening in a housing wall of the switchgear housing. The exhaust channel comprises a narrowing and exhaust channel inlet holes, which are arranged at the narrowing and which are provided to supply fresh air from outside of the exhaust channel into the interior of the exhaust channel.

13 Claims, 7 Drawing Sheets

EXHAUST OF HOT GASES RESULTING FROM AN ARC EVENT IN AN ELECTRIC SWITCHGEAR

CROSS-REFERENCE TO RELATED APPLICATIONS

The present disclosure claims the priority to Great Britain patent application with the filing number 2303866.4 filed on Mar. 16, 2023 with the UK Intellectual Property Office, the contents of which are incorporated herein by reference in entirety.

TECHNICAL FIELD

The presently disclosed subject matter relates to an electric switchgear, which comprises a switchgear housing and an exhaust channel, wherein the exhaust channel passes through or connects to an opening in a (first) housing wall of the switchgear housing.

BACKGROUND ART

An electric switchgear of the above kind is generally known. An arc event in the switchgear housing causes overpressure in the switchgear housing and thus a main gas flow from the switchgear housing into the exhaust channel and finally out of the switchgear housing. Under certain circumstances, unburned gases can exit the exhaust channel and can propagate to an exterior of the switchgear housing. This usually is less problematic if the blow out of the electric switchgear is arranged outside but may become a serious problem when the electric switchgear is located in a building or switchgear room. Unburned gases can cause a (cold) flue gas explosion there (also named as smoke explosion, fire gas explosion or fire gas ignition) and cause damages and/or injuries. This problem is particularly true if cooling elements are arranged in the exhaust channel. At first sight, this sounds weird because usually it is a good idea to cool down hot gases before they propagate to an environment of the electric switchgear so as to avoid damages and/or injuries caused by the heat or the explosive pressure. However, there are two reasons why using a cooling element in the exhaust channel has also a negative effect. First, the lower the temperature is the higher is the share of unburned gases. Second, the volume of the cooling element reduces the free air volume within the exhaust channel and thus reduces oxygen, which is needed to burn the exhaust gases caused by the arc event resulting from dielectric failure between parts under high voltage respectively.

DETAILED DESCRIPTION

Accordingly, an aspect of the presently disclosed subject matter is the provision of an improved electric switchgear. In particular, a solution shall be provided, which avoids or at least reduces the risk of a flue gas explosion outside of a switchgear housing.

The aspect of the presently disclosed subject matter is solved by a switchgear as defined in the opening paragraph, wherein the exhaust channel comprises a narrowing and exhaust channel inlet holes, which are arranged at the narrowing and which are provided to supply (fresh) air from outside of the exhaust channel into the interior of the exhaust channel.

By use of the proposed measures, a main air flow through the exhaust channel caused by an arc event in the switchgear housing causes a local underpressure at the narrowing based on Bernoulli's principle. That is why air is sucked into the exhaust channel through the exhaust channel inlet holes. In this way, extra oxygen enters the exhaust channel what helps to burn unburned gases. In detail, the (fresh) air from outside of the exhaust channel provides oxygen to react with unburned components in the gases that result from the arcing. Hence, no or less unburned gases exit the exhaust channel thereby avoiding or at least reducing uncontrolled flames or even a flue gas explosion outside of the switchgear housing.

"Air" or "fresh air" in the context of this disclosure particularly means a gas mixture with around 21% oxygen and around 79% nitrogen as main parts. The share of oxygen may be lower, however, to provide the claimed effect, the gas mixture shall comprise a considerable minimum share of oxygen. In particular, the share of oxygen in air should be higher than 10% (which is the minimum share of oxygen before unconsciousness occurs). "Fresh air" in particular means a gas mixture comprising at least 15% of oxygen.

The proposed measures particularly relate to electric switchgears having an electrical connection with a nominal short circuit power of >50 MVA and hence to switchgears involving a high risk of a high power arc in case of an arc event. In particular, a switching device can be arranged in the switchgear housing causing switching arc events. However, the proposed measures relate also to arc events between electrical conductors under high voltage in general.

Generally, a) the exhaust channel can be fully arranged within the switchgear housing, and the inlet holes can be are arranged within the switchgear housing as well or b) the exhaust channel can be fully arranged out of the switchgear housing, and the inlet holes can be arranged out of the switchgear housing as well or c) the exhaust channel can be arranged partly within the switchgear housing and partly out of the switchgear housing, and the inlet holes can be arranged within the switchgear housing or d) the exhaust channel can be arranged partly within the switchgear housing and partly out of the switchgear housing, and the inlet holes can be arranged out of the switchgear housing.

The exhaust channel is not necessarily straight but may comprise direction changes. So, in principle, the air supply for the exhaust channel and its exhaust channel outlet can also be arranged on the same housing wall or on different housing walls. The first housing wall in particular may be a top wall of the switchgear housing. In addition, the switchgear housing may comprise a plurality of (second) side walls.

Further advantageous embodiments are disclosed in the claims and in the description as well as in the figures.

In one embodiment, the electric switchgear can comprise an inner housing, which surrounds the switching device, is arranged within the switchgear housing and is pneumatically connected to the exhaust channel. In this embodiment, the inlet holes are provided to supply (fresh) air from outside of the inner housing into the interior of the exhaust channel. Beneficially, hot gases can be kept in a predefined space within the switchgear housing so that parts out of the inner housing are not effected by said hot gases.

In one further embodiment,

A) the exhaust channel can directly be located at or comprise a (second) housing wall of the switchgear housing, wherein the inlet holes directly lead out of the switchgear housing or B) the exhaust channel can be spaced from a (second) housing wall of the switchgear housing, wherein the inlet holes connect to the interior of the switchgear housing or C) the exhaust channel can be spaced from a (second) housing wall of the switchgear housing, wherein the inlet holes are connected to at least one supply tube or supply channel, which leads out of the switchgear housing.

In cases A) and C) fresh air is sucked into the exhaust channel from outside of the switchgear housing, whereas in case B) air from the interior of the switchgear housing is used. Accordingly, care should be taken in case B) that the interior of the switchgear housing encloses a sufficiently high air volume and/or comprises sufficiently big air inlets for pressure relief.

Beneficially, the exhaust channel can have surrounding channel walls and the narrowing can be formed by one or more of the channel walls, which in cross sectional view i) has a triangular surface facing the interior of the exhaust channel, wherein the exhaust channel inlet holes are arranged in the triangular surface, or ii) has a trapezoid surface facing the interior of the exhaust channel, wherein the exhaust channel inlet holes are arranged in the trapezoid surface, or iii) has a curved surface facing the interior of the exhaust channel, wherein the exhaust channel inlet holes are arranged in the curved surface.

In this embodiment, the narrowing is directly formed by the one or more of the channel walls. That is why no extra parts are needed for forming the narrowing. Moreover, by the provision of different surfaces, the exhaust channel can be adapted to various requirements. It should be noted that one or more of the surrounding channel walls may be formed by or comprised of the (second) housing wall of the switchgear housing in case A). Accordingly, the housing wall can provide a double function.

Alternatively, the exhaust channel can have surrounding channel walls, the narrowing can be embodied by a profile part attached to the inner side of the channel wall, the channel wall can comprise secondary holes, the profile part can comprise the exhaust channel inlet holes arranged at the narrowing and both the secondary holes and the exhaust channel inlet holes can connect to a space formed between the channel wall and the profile part.

In particular, the profile part may have i) a triangular surface facing the interior of the exhaust channel, wherein the exhaust channel inlet holes are arranged in the triangular surface, or ii) a trapezoid surface facing the interior of the exhaust channel, wherein the exhaust channel inlet holes are arranged in the trapezoid surface, or iii) a curved surface facing the interior of the exhaust channel, wherein the exhaust channel inlet holes are arranged in the curved surface.

In this embodiment, the narrowing is formed by a dedicated profile part. Accordingly, the channel wall can have a simple shape which is easy to produce. Moreover, by providing different profile parts, the exhaust channel can be adapted to various requirements easily. In particular, the secondary holes can connect to the interior of the switchgear housing or to at least one supply tube or supply channel, which leads out of the switchgear housing. Again, one should note that one or more of the surrounding channel walls may be formed by or comprised of the (second) housing wall of the switchgear housing in case A) and that accordingly the housing wall can provide a double function.

In one embodiment, the exhaust channel inlet holes can be arranged at the narrowest point of the narrowing. In this way, the exhaust channel inlet holes are arranged at a point of very high local underpressure what supports the inflow of fresh air.

In another embodiment, the exhaust channel inlet holes can be arranged after the narrowing seen in flow direction of a gas expanding in the inner housing. The main air flow may cause turbulences or a vortex behind the narrowing. By arranging the exhaust channel inlet holes in this region, inflow of fresh air can be supported even more. In addition, the risk for a reflux of air, i.e. from the exhaust channel through the exhaust channel inlet holes can be reduced.

Advantageously, the electric switchgear can comprise a cooling structure or cooling element (in particular a ceramic cooling structure or element), which is arranged after the exhaust channel inlet holes seen in flow direction of a gas expanding in the inner housing. In particular, the cooling structure or element can even be arranged after the narrowing seen in flow direction of a gas expanding in the inner housing. In this way, the hot gases can be cooled down before the exit the switchgear housing without risking that the burnable gases coming from the switch are not considerably or even fully burned because of low temperature.

In yet another advantageous embodiment, the electric switchgear can comprise one or more check valves, which allow a gas flow into the exhaust channel through the exhaust channel inlet holes and block a gas flow out of the exhaust channel through the exhaust channel inlet holes. In particular, the electric switchgear can comprise one or more check valves, which in allow a gas flow from the interior of the switchgear housing into the exhaust channel through the exhaust channel inlet holes and block a gas flow from the exhaust channel into to the interior of the switchgear housing through the exhaust channel inlet holes or which allow a gas flow from the at least one supply tube or supply channel into the exhaust channel through the exhaust channel inlet holes and block a gas flow from the exhaust channel into the at least one supply tube or supply channel through the exhaust channel inlet holes.

In this way, an unwanted reflux of air, i.e. from the exhaust channel through the exhaust channel inlet holes, can be avoided.

BRIEF DESCRIPTION OF DRAWINGS

The presently disclosed subject matter now is described in more detail hereinafter with reference to particular embodiments, which the presently disclosed subject matter however is not limited to.

DETAILED DESCRIPTION

Generally, same parts or similar parts are denoted with the same/similar names and reference signs. The features disclosed in the description apply to parts with the same/similar names respectively reference signs. Indicating the orientation and relative position is related to the associated figure, and indication of the orientation and/or relative position has to be amended in different figures accordingly as the case may be.

Figure 1:
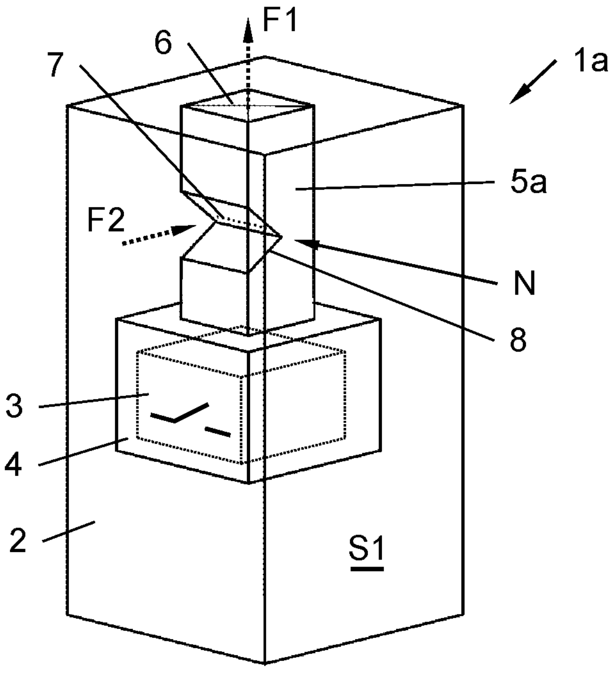
FIG. 1 shows an oblique view of an exemplary electric switchgear.

FIG. 1 shows an oblique view of an exemplary electric switchgear 1*a*, wherein the electric switchgear 1*a* and its components are drawn transparently to allow a view into the electric switchgear 1*a* or an interior view of the electric switchgear 1*a*, respectively. The electric switchgear 1*a* comprises a switchgear housing 2, an optional switching device 3 arranged in the switchgear housing 2 and an optional inner housing 4, which surrounds the switching device 3 and which is arranged within the switchgear housing 2. Moreover, the electric switchgear 1*a* comprises an exhaust channel 5*a*, which connects to the inner housing 4 and which leads out of the switchgear housing 2. In detail, the exhaust channel 5*a* connects to an opening in the housing wall of the switchgear housing 2 and comprises an exhaust channel outlet 6 on top of the switchgear housing 2. Alternatively, the exhaust channel outlet 6 may also be arranged on one of the side walls of the switchgear housing 2 (see also FIGS. 11 and 12 in this context). In addition, the exhaust channel 5*a* comprises a narrowing N and exhaust channel inlet holes 7, which are arranged at the narrowing N and which connect to the interior S1 of the switchgear housing 2 in this embodiment. The narrowing N can be formed by a triangular section 8, which in cross sectional view has a triangular surface facing the interior of the exhaust channel 5*a*, like this is the case in FIG. 1. As can be seen, the exhaust channel inlet holes 7 are arranged (right) after the narrowing N seen in flow direction of a gas expanding in the inner housing 4.

Figure 2:
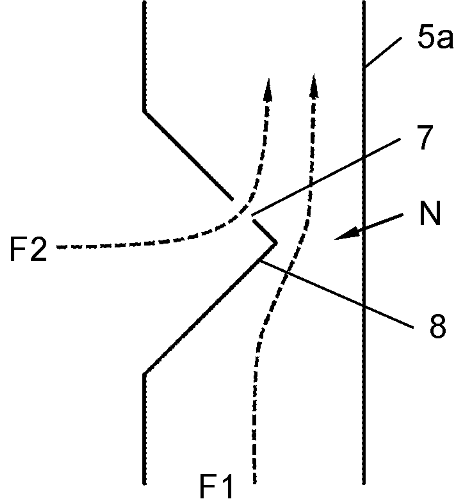
FIG. 2 shows a schematic cross sectional view of the exhaust channel in the region of a narrowing.

FIG. 2 shows a schematic cross sectional view of the exhaust channel 5*a* in the region of the narrowing N. An arc event in the switching device 3 causes overpressure in the inner housing 4 and thus a main air flow F1 from the inner housing 4 to the exhaust channel outlet 6. The narrowing N causes a local underpressure based on Bernoulli's principle. That is why air from the interior S1 of the switchgear housing 2 is sucked into the exhaust channel 5*a* through the exhaust channel inlet holes 7 what is depicted by the secondary air flow F2. In this way, extra oxygen from the air from the interior S1 of the switchgear housing 2 supports the burn of unburned gases, so that ideally no unburned gases exit the exhaust channel outlet 6. Accordingly, the risk of uncontrolled flames or even a (cold) flue gas explosion (also named as smoke explosion, fire gas explosion or fire gas ignition) outside of the switchgear housing 2 is avoided or at least reduced.

It should be noted that the narrowing N in the example of FIGS. 1 and 2 is formed by a triangular section 8 on just one side wall. However, the narrowing N may also be formed by narrowing sections on more than one side wall.

It should also be noted that, although not shown, the electric switchgear 1*a* may comprise one or more pressure relief valves, for example in the switchgear housing 2 and/or in the inner housing 4. In particular, a pressure relief valve may be arranged at the inlet of the exhaust channel 5*a* (which in this example coincides with the outlet of the inner housing 4) and may be provided to open only if the difference pressure between an exterior and the interior of the exhaust channel 5*a* exceeds a predefined threshold.

Generally, the switching device 3 and/or other electric parts within the switchgear 1*a* (e.g. bus bars) can be connected to an electrical connection of the switchgear 1*a* by which the switchgear 1*a* or the electric parts within the switchgear 1*a* respectively can be connected to a power grid. In particular, the electrical connection can have a nominal short circuit power of >50 MVA.

Figure 3:
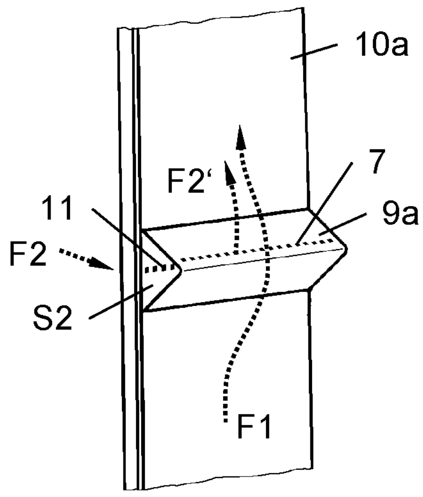
FIG. 3 shows an oblique front view of channel wall, where the narrowing is embodied by a separate profile part or from inside of the channel.
Figure 4:
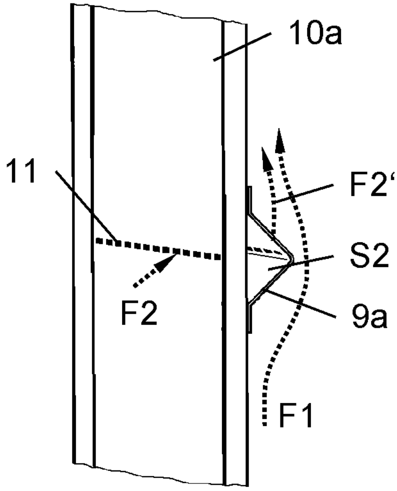
FIG. 4 shows the arrangement of FIG. 3 in oblique view from behind or from outside of the channel.

FIGS. 3 and 4 show an embodiment, which is very similar to that shown in FIGS. 1 and 2. In contrast, the narrowing N is embodied by a separate profile part 9*a* on the channel wall 10*a*. In detail, FIG. 3 shows a (rear) channel wall 10*a* with the profile part 9*a* in oblique front view from above, and FIG. 4 shows the arrangement in oblique view from behind. Note that the FIGS. 3 and 4 do not show a complete exhaust channel ready for operation. Hence FIGS. 3 and 4 are just intended to illustrate the function.

In this embodiment, the channel wall 10*a* comprises secondary holes 11, which connect to the interior S1 of the switchgear housing 2, and the profile part 9*a* comprises the exhaust channel inlet holes 7 arranged at the narrowing N. Both the secondary holes 11 and the exhaust channel inlet holes 7 connect to a space S2 formed between the channel wall 10*a* and the profile part 9*a*. As can be seen in FIGS. 3 and 4, there is secondary air flow F2 from the interior S1 of the switchgear housing 2 to the space S2 between the channel wall 10*a* and the profile part 9*a* and a secondary air flow F2' from the space S2 into the exhaust channel. However, the function of burning unburned gases is the same as for the embodiment of FIGS. 1 and 2.

Figure 5:
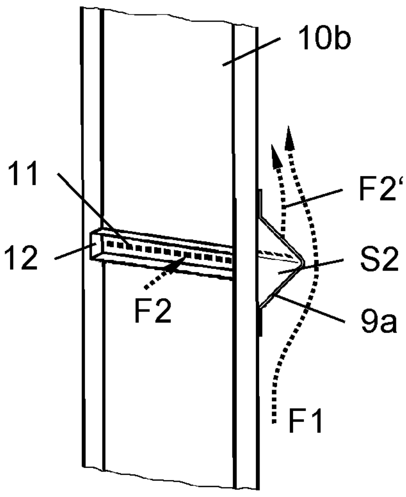
FIG. 5 shows an oblique view of a channel wall with a valve holder from behind.
Figure 6:
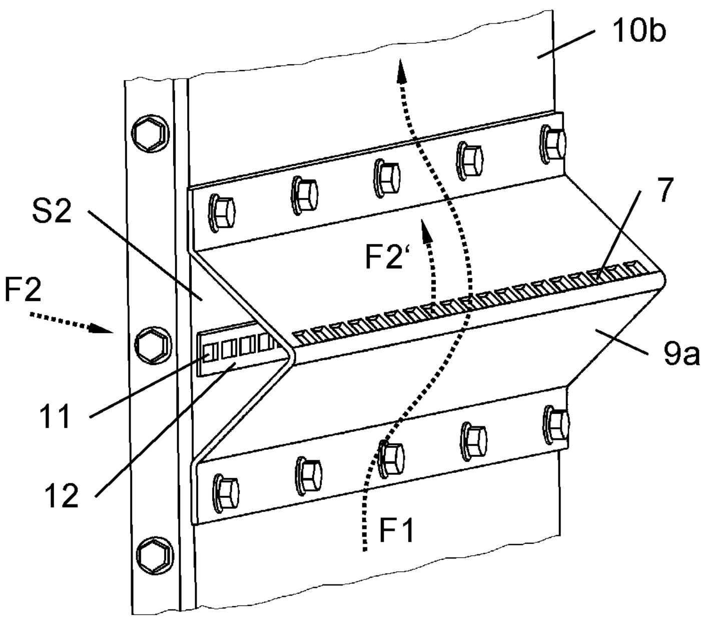
FIG. 6 shows a detailed view of a triangular profile part.
Figure 7:
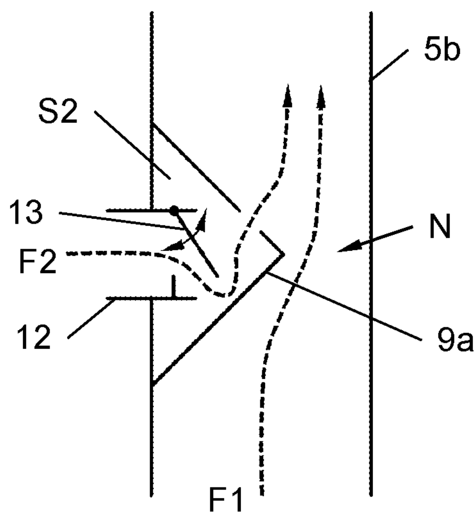
FIG. 7 shows a schematic view illustrating the function of check valves.

FIGS. 5 to 7 show another embodiment of an exhaust channel 5*b*, which is similar to the exhaust channels 5*a* shown in FIGS. 1 to 4. In contrast, the arrangement shown in FIGS. 5 to 7 comprises a valve holder 12 with a number of optional check valves 13, which block a gas flow out of the exhaust channel 5*b* to the interior S1 of the switchgear housing 2. The check valves 13 only open in case of underpressure in the exhaust channel 5*b* and close in case that the pressure in the exhaust channel 5*b* is higher than in the interior S1 of the switchgear housing 2. FIG. 5 shows the arrangement in oblique view from behind, FIG. 6 shows a detailed view of the triangular profile part 9*a*, and FIG. 7 shows a schematic cross sectional view of the exhaust channel 5*b* in the region of the narrowing N. In this example, the check valve 13 is embodied by a swiveling flap 13 to illustrate its function. However, the check valve 13 may also be embodied differently.

Figure 8:
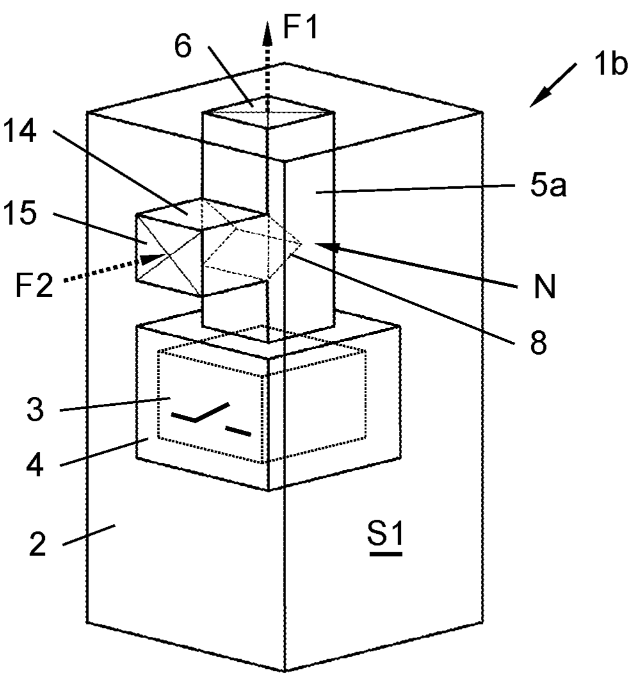
FIG. 8 shows an exemplary electric switchgear with a dedicated supply channel.

FIG. 8 shows an exemplary electric switchgear 1*b*, which is very similar to the electric switchgear 1*a* of FIG. 1. In contrast, a supply channel 14 is provided, which is connected to the secondary holes 11 and which leads out of the switchgear housing 2 and forms a supply channel inlet 15 there. The supply channel inlet 15 is arranged on one of the side walls in this example but it may also be arranged on top of the switchgear housing 2. However, a circular flow from the exhaust channel outlet 6 into the supply channel inlet 15 shall be avoided by arranging the exhaust channel outlet 6 and the supply channel inlet 15 displaced from each other.

The function of the electric switchgear 1*b* is very much the same as the function of the electric switchgear 1*a*. In contrast, the exhaust channel inlet holes 7 are not connected to the interior S1 of the switchgear housing 2 but to a surrounding of the switchgear housing 2. So, if a supply channel 14 is provided in the above examples, the surrounding of switchgear housing 2 functionally replaces the interior S1. That in particular means that air is sucked into the exhaust channel 5*b* from the outside by means of a secondary air flow F2. In case that check valves 13 are provided, they close if the pressure in the exhaust channel 5*b* is higher than in the exterior of the switchgear housing 2. Instead of a common supply channel 14, alternatively the exhaust channel inlet holes 7 or the secondary holes 11 can be connected to the exterior of the switchgear housing 2 by a number of supply tubes leading out of the switchgear housing 2.

Figure 9:
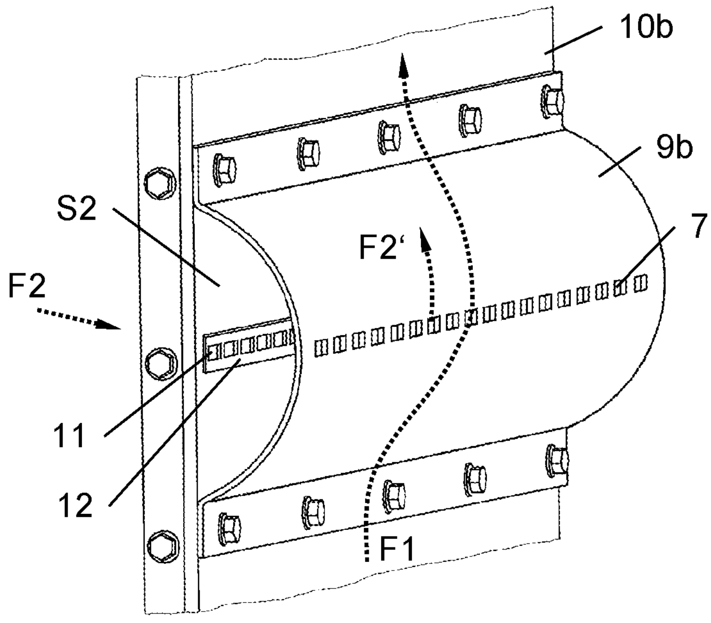
FIG. 9 shows an oblique view of a curved profile part.

In the above embodiments, the narrowing N is formed by a triangular course of the channel wall 10*a* or the profile part 9*a*. However, this is not the only possibility, and the narrowing N can be also formed by a curved course of the channel wall 10*a* or a profile part 9*b* like this is depicted in FIG. 9. In particular, the exhaust channel inlet holes 7 can be arranged at the narrowest point of the narrowing N like this is depicted in FIG. 9. However, the exhaust channel inlet holes 7 may also be arranged Oust) after the narrowing N like this is the case in the before examples. Vice versa, the exhaust channel inlet holes 7 in the embodiments of FIGS. 1 to 8 may be arranged at the narrowest point of the narrowing N. Generally, the triangular course can be replaced by a curved course in the embodiments of FIGS. 1 to 8. Other shapes are possible as well, for example, a trapezoid course.

Figure 10:
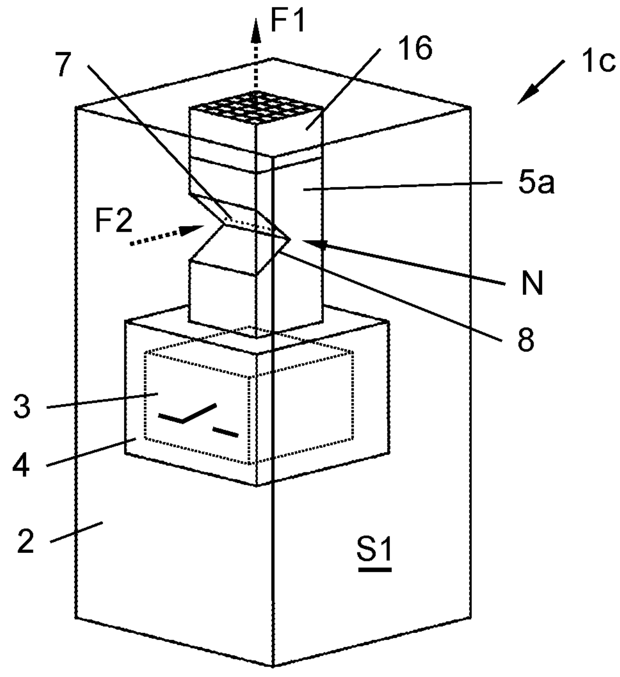
FIG. 10 shows an oblique view of an exemplary electric switchgear with a cooling element in the course of the exhaust channel.

FIG. 10 shows an embodiment of an electric switchgear 1*c*, which is similar to the electric switchgear 1*a* of FIG. 1. In contrast, a cooling structure or element 16, in particular a ceramic cooling structure or element, is provided after the narrowing N seen in flow direction of a gas expanding in the inner housing 4. In this way, hot gases can be cooled down before they depart from the exhaust channel outlet 6. However, beneficially, fresh air is supplied to the hot gases before the cooling structure or element 16. That is why the gases are comparably hot at the exhaust channel inlet holes 7 what supports burning of unburned gases. Of course, a cooling structure or element 16 can also be provided after the narrowing N in the embodiment depicted in FIG. 8.

Figure 11:
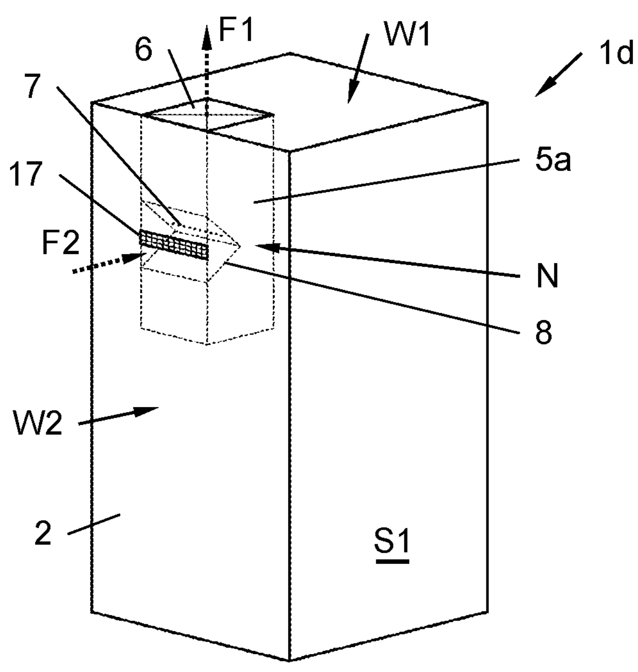
FIG. 11 shows an embodiment of a switchgear where the exhaust channel is directly located at a (second) housing wall of the switchgear housing.

FIG. 11 shows an embodiment of a switchgear 1*d* where the exhaust channel 5*a* is directly located at a (second) housing wall W2 of the switchgear housing 2. In this case, the inlet holes 7 directly lead out of the switchgear housing 2, wherein in this particular embodiment an optional grid 17 is provided to keep dirt and animals away from the inlet holes 7. “Directly” in the given context in particular means “without a supply tube or supply channel 14”. In one embodiment, the outer surrounding channel wall may be formed by or comprised of the (second) housing wall W2 of the switchgear housing 2. Accordingly, the housing wall W2 can provide a double function, and one surrounding channel wall can be saved.

Figure 12:
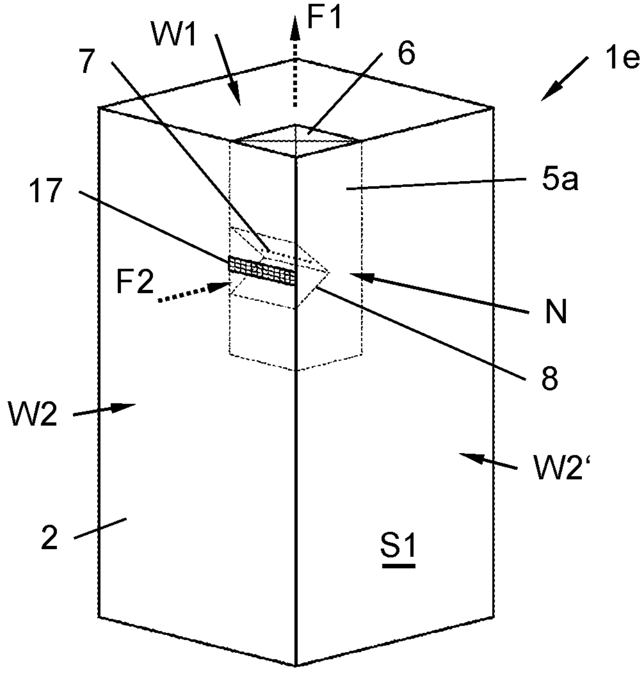
FIG. 12 shows an embodiment of a switchgear where the exhaust channel is located in a corner of the switchgear housing.

FIG. 12 shows an embodiment of a switchgear 1*e*, which is very similar to the switchgear 1*d* of FIG. 11. However, the exhaust channel 5*a* is located in a corner of the switchgear housing 2 now. Accordingly, two outer surrounding channel walls may be formed by or comprised of the (second) housing walls W2, W2' of the switchgear housing 2.

In FIGS. 11 and 12, the first (top) housing wall W1 and the second (side) housing walls W2, W2' are explicitly denoted with reference signs. In FIGS. 11 and 12 (and in FIGS. 1, 8 and 10 to 12) the first (top) housing wall W1 is the one having the opening for the exhaust channel 5*a*, 5*b*, and the second (side) housing walls W2, W2' are the ones, which the exhaust channel 5*a*, 5*b* runs parallel to. However, this differentiation shall not be construed as limiting the claims, and the housing wall can also be seen as one single part of the switchgear housing 2. It should also be noted that the exhaust channel outlet 6 is not necessarily arranged on the first (top) housing wall W1, and/or the exhaust channel 5*a*, 5*b* does not necessarily run parallel to the second (side) housing walls W2, W2'. Instead, the exhaust channel outlet 6 can also be arranged on a second (side) housing wall W2, W2' and/or the exhaust channel 5*a*, 5*b* can run parallel to the first (top) housing wall W1. Generally, the exhaust channel 5*a*, 5*b* is not necessarily straight either but may comprise direction changes. So, in principle, the air supply for the exhaust channel 5*a*, 5*b* and its exhaust channel outlet 6 can also be arranged on the same housing wall W1 . . . W2'.

Figure 13:
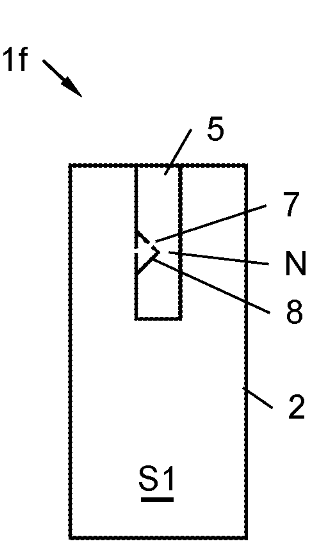
FIG. 13 shows an embodiment where the exhaust channel and the inlet holes are arranged within the switchgear housing.
Figure 14:
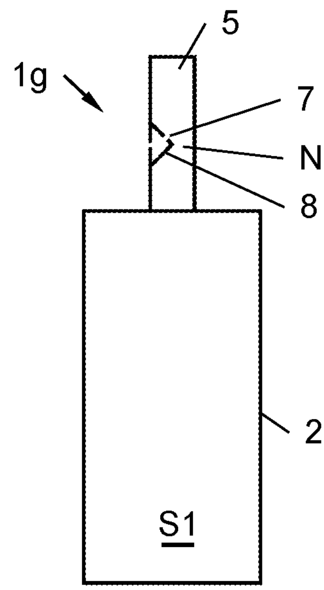
FIG. 14 shows an embodiment where the exhaust channel and the inlet holes are arranged out of the switchgear housing.
Figure 15:
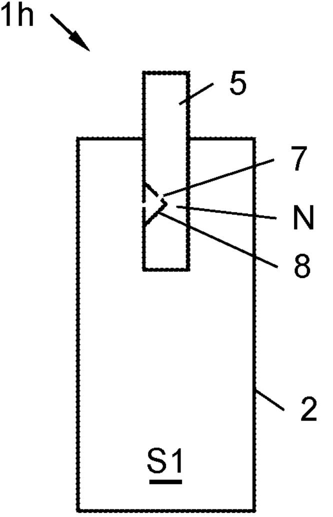
FIG. 15 shows an embodiment where the exhaust channel is partly arranged within the switchgear housing, and the inlet holes are arranged within the switchgear housing
Figure 16:
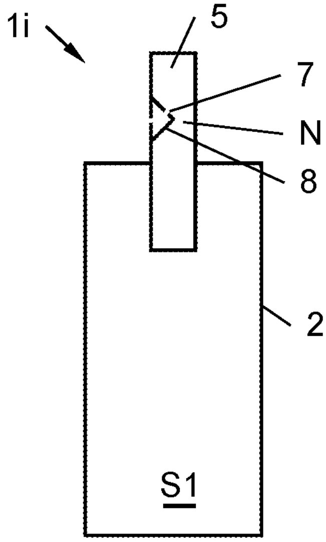
FIG. 16 shows an embodiment where the exhaust channel is partly arranged within the switchgear housing, and the inlet holes are arranged out of the switchgear housing.

FIGS. 13 to 16 now show schematic side views of switchgears 1*f* . . . 1*i* having differently located exhaust channels 5. In the embodiment of FIG. 13, the exhaust channel 5 is fully arranged within the switchgear housing 2, and the inlet holes 7 are arranged within the switchgear housing 2 as well. In the embodiment of FIG. 14, the exhaust channel 5 is fully arranged out of the switchgear housing 2, and the inlet holes 7 are arranged out of the switchgear housing 2 as well. In the embodiment of FIG. 15, the exhaust channel 5 is arranged partly within the switchgear housing 2 and partly out of the switchgear housing 2, and the inlet holes 7 are arranged within the switchgear housing 2. In the embodiment of FIG. 16, finally the exhaust channel 5 is arranged partly within the switchgear housing 2 and partly out of the switchgear housing 2 again, but the inlet holes 7 are arranged out of the switchgear housing 2.

In FIGS. 13 and 14 (and in FIGS. 1, 8 and 10 to 12), the exhaust channel 5 connects to an opening in a (first) housing wall W1 of the switchgear housing 2, whereas in FIGS. 15 and 16 the exhaust channel 5 passes through an opening in a (first) housing wall W1 of the switchgear housing 2.

Generally, one should note that although in FIGS. 11 and 12 no switching device 3 and no interior housing 4 is shown, the switchgears 1*d*, 1*e* of FIGS. 11 and 12 may also comprise a switching device 3 and/or an interior housing 4. Additionally, one should also note, that in the embodiments disclosed by means of FIGS. 1 to 10 a switching device 3 and/or an interior housing 4 may be omitted. In these cases, the exhaust channel 5*a* may collect hot gases from the whole interior S1 of the switchgear housing 2. If no interior housing 4 is provided, fresh air should be sucked into the exhaust channel 5*a* from outside of the switchgear housing 2 (see FIGS. 14 and 16 for example). One should also note that the arrangements of the exhaust channels 5 and the inlet holes 7 disclosed by means of FIGS. 13 to 16 apply to all kind of switchgears 1*a* . . . 1*e* and embodiments shown by means of FIGS. 1 to 10 (e.g. with or without switching device 3, with or without interior housing 4, with or without profile part 9*a*, 9*e*, with or without cooling element 16, etc.). An arc event resulting from dielectric failure can happen between parts under high voltage in general. In particular, the arc event can be a switching arc if a switching device 3 is provided in the electric switchgear 1*a* . . . 1*i*.

It is also noted that the presently disclosed subject matter is not limited to the embodiments disclosed hereinbefore, but combinations of the different variants are possible. In reality, the electric switchgear 1*a* . . . 1*i* may have more or less parts than shown in the figures. Moreover, the description may comprise subject matter of further independent embodiments.

Finally, it should also be noted that the term "comprising" does not exclude other elements and the use of articles "a" or "an" does not exclude a plurality. Also elements described in association with different embodiments may be combined. It should also be noted that reference signs in the claims should not be construed as limiting the scope of the claims.

LIST OF REFERENCE NUMERALS

1*a* . . . 1*i* electric switchgear
2 switchgear housing
3 switching device
4 inner housing
5, 5*a*, 5*b* exhaust channel
6 exhaust channel outlet
7 exhaust channel inlet hole
8 triangular section
9*a*, 9*b* profile part
10*a*, 10*b* (rear) channel wall
11 secondary hole
12 valve holder
13 check valve
14 supply channel
15 supply channel inlet
16 cooling structure/element
17 grid
F1 main air flow
F2, F2' secondary air flow
S1 interior of switchgear housing
S2 space between channel wall and profile part
N narrowing
W1 . . . W2' housing wall

The invention claimed is:

1. An Electric-electric switchgear, comprising:
a switchgear housing;
a switching device arranged in the switchgear housing;
an inner housing arranged within the switchgear housing and surrounding the switching device, wherein the inner housing is pneumatically connected to an exhaust channel,
wherein the exhaust channel passes through or connects to an opening in a housing wall of the switchgear housing,
wherein the exhaust channel comprises a narrowing and exhaust channel inlet holes, which are arranged at the narrowing and which are provided to supply air from outside of the inner housing into the interior of the exhaust channel, and
wherein the electric switchgear is configured such that, in use, a main air flow through the exhaust channel caused by an arc event in the switchgear housing causes a local underpressure at the narrowing based on Bernoulli's principle and air to be sucked into the exhaust channel through the exhaust channel inlet holes and support the burn of unburned gases in the exhaust channel.

2. The electric switchgear as claimed claim 1, wherein
a) the exhaust channel is fully arranged within the switchgear housing, and the inlet holes are arranged within the switchgear housing as well or
b) the exhaust channel is fully arranged out of the switchgear housing, and the inlet holes are arranged out of the switchgear housing as well or
c) the exhaust channel is arranged partly within the switchgear housing and partly out of the switchgear housing, and the inlet holes are arranged within the switchgear housing or
d) the exhaust channel is arranged partly within the switchgear housing and partly out of the switchgear housing, and the inlet holes are arranged out of the switchgear housing.

3. The electric switchgear as claimed in claim 2, wherein
A) the exhaust channel is directly located at or comprises a housing wall of the switchgear housing, wherein the inlet holes directly lead out of the switchgear housing or
B) the exhaust channel is spaced from a housing wall of the switchgear housing, wherein the inlet holes connect to the interior of the switchgear housing or
C) the exhaust channel is spaced from a housing wall of the switchgear housing, wherein the inlet holes are connected to at least one supply tube or supply channel, which leads out of the switchgear housing.

4. The electric switchgear as claimed in claim 3, wherein
the exhaust channel has surrounding channel walls and
the narrowing is formed by one or more of the channel walls, which in cross sectional view
i) has a triangular surface facing the interior of the exhaust channel, wherein the exhaust channel inlet holes are arranged in the triangular surface, or
ii) has a trapezoid surface facing the interior of the exhaust channel, wherein the exhaust channel inlet holes are arranged in the trapezoid surface, or
iii) has a curved surface facing the interior of the exhaust channel, wherein the exhaust channel inlet holes are arranged in the curved surface.

5. The electric switchgear as claimed in claim 3, wherein
the exhaust channel has surrounding channel walls,
the narrowing is embodied by a profile part attached to the inner side of the channel wall,
the channel wall comprises secondary holes,
the profile part comprises the exhaust channel inlet holes arranged at the narrowing and
both the secondary holes and the exhaust channel inlet holes connect to a space formed between the channel wall and the profile part.

6. The electric switchgear as claimed in claim 5, wherein the profile part
i) has a triangular surface facing the interior of the exhaust channel, wherein the exhaust channel inlet holes are arranged in the triangular surface, or ii) has a trapezoid surface facing the interior of the exhaust channel, wherein the exhaust channel inlet holes are arranged in the trapezoid surface, or iii) has a curved surface facing the interior of the exhaust channel, wherein the exhaust channel inlet holes are arranged in the curved surface.

7. The electric switchgear as claimed in claim 6, wherein the exhaust channel inlet holes are arranged after the narrowing seen in flow direction of a gas expanding in the inner housing.

8. The electric switchgear as claimed in claim 6, wherein the exhaust channel inlet holes are arranged at the narrowest point of the narrowing.

9. The electric switchgear as claimed in claim 8, wherein a cooling structure or element, which is arranged after the exhaust channel inlet holes seen in flow direction of a gas expanding in the inner housing.

10. The electric switchgear as claimed in claim 9, wherein a cooling structure or element, which is arranged after the narrowing seen in flow direction of a gas expanding in the inner housing.

11. The electric switchgear as claimed in claim 10, wherein one or more check valves, which allow a gas flow into the exhaust channel through the exhaust channel inlet holes and block a gas flow out of the exhaust channel through the exhaust channel inlet holes.

12. The electric switchgear as claimed in claim 1, wherein an electrical connection with a nominal short circuit power of >50 MVA.

13. The electric switchgear as claimed in claim 1, further comprising:

a cooling structure arranged over the narrowing, wherein in use, hot gases generated by burning of the unburned gases in the exhaust channel are cooled by the ceramic cooling structure.

* * * * *